United States Patent Office 2,995,546
Patented Aug. 8, 1961

2,995,546
CHLORINATING BUTYL RUBBER IN THE PRESENCE OF EPOXY ALKANES
Delmer L. Cottle, Highland Park, Leon Sherwood Minckler, Jr., Metuchen, and Theodore Lemiszka, Roselle, N.J., assignors to Esso Research and Engineering Company, a corporation of Delaware
No Drawing. Filed Oct. 16, 1958, Ser. No. 767,517
4 Claims. (Cl. 260—85.3)

This invention relates to an improved method of processing halogenated rubbery copolymers. More particularly it relates to a process of this nature wherein a butyl rubber is halogenated while in a solution in an inert hydrocarbon in the presence of a lower epoxy alkane and to improved formulations.

Halogenated butyl rubber is advantageously produced by the controlled halogenation of a solution of unvulcanized hydrocarbon rubbery copolymer. The rubbery hydrocarbon copolymer, which is produced in a reaction zone at a temperature level of between about −80° C. and −165° C., is in the form of a slurry suspended in about 1 to 10 volumes of a $C_1$ to $C_3$ alkyl halide diluent. This slurry is then caused to flow into a flash drum where it is contacted with a hot inert solvent such as a $C_5$ to $C_{10}$ aliphatic hydrocarbon which drives off volatile materials such as the alkyl halide and dissolves the butyl rubber in the solvent. The concentration of this polymer in the solution is generally in the range of 5 to 25 wt. percent. The butyl rubber is then halogenated while dissolved in the solvent.

The halogenated copolymers are then generally washed with aqueous alkaline reagents such as sodium hydroxide, followed by water washing to remove salts. This treatment is necessary in order to protect the processing equipment against corrosion and prevent discoloration in the polymer. In general several washes have been required. This has also been true because in the absence of these washings conventional stabilizers, such as calcium stearate and epoxy compounds having a minimum boiling point of 150° C., for these synthetic rubbers can be ineffective.

It has now been found that by conducting the halogenation of the copolymers contained in the inert hydrocarbon solution in the presence of a small amount of a lower epoxy-alkane the necessity for the water washing and the treatment with the alkaline reagent is eliminated. The lower epoxyalkane can alternatively be added after halogenation for the same purpose.

The halogenated butyl rubber-containing solution formed is subsequently contacted with steam and hot water in the presence of the stabilizers to slurry the resulting halogenated butyl rubber in aqueous suspension. The halogenated butyl rubber is then recovered by dewatering and degassing extrusion or the like wherein the finishing temperatures are advantageously regulated to a temperature level of between about 100° and 175° C.

The epoxyalkane is utilized in a small amount, i.e. 0.7 to 5.0 wt. percent based on polymer. The lower epoxyalkanes that can be used are rather volatile and include those having from 2 to 5 carbon atoms and substituted derivatives thereof, e.g. epoxyethane, epoxypropane, 2,3-epoxybutane, etc. Epoxyethane and epoxypropane are especially effective. Particularly effective and desirable is epoxyethane.

The stabilizers, i.e. calcium stearate or an epoxy compound having a minimum boiling point of 150° C., e.g., polyallylglycidyl ether, are utilized in an amount of from 0.25 wt. percent to 5 wt. percent also based on the polymer.

Butyl rubber is essentially a vulcanizable, rubbery hydrocarbon copolymer containing about 85 to 99.5 wt. percent, preferably about 95 to 99.5 wt. percent, of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethylbutadiene, piperylene, or such multiolefins as vinyl fulvenes, cyclopentadiene, cyclohexadiene, or especially isoprene. The resulting rubbery copolymer has a Staudinger molecular weight of about 20,000 to about 300,000, a mole percent unsaturation of between about 0.5 to 15.0, and an iodine number of about 0.5 to 50.0 (Wijs). The preparation of such a copolymer, known in the art as butyl rubber, is described in U.S. Patent 2,356,128 to Thomas et al. and also in other patents as well as in the literature.

In producing halogenated butyl rubber a solution of the butyl rubber in the inert solvent is contacted at a temperature level of above 0° C. and about 30° C. with such halogenating agents as gaseous chlorine, liquid bromine, iodine chloride, or sulfuryl chloride at room temperature or with N-chlorosuccinimide; N,N' dibromo-5,5-dimethyl hydantoin or the like. The halogenation is carried out so as to make the resulting halogenated butyl rubber contain at least about 0.5 wt. percent, preferably at least about 1.0 wt. percent halogen but not more than a halogen content of about 3.0 "X" wt. percent (in the case of bromine) and not more than a halogen content of about 1.0 "X" wt. percent (in the case of chlorine) wherein:

$$X = \frac{M_3 L}{(100-L) M_1 + L(M_2 + M_3)} \times 100$$

and $L$=mole percent of the multiolefin in the polymer
$M_1$=molecular weight of the isoolefin
$M_2$=molecular weight of the multiolefin
$M_3$=atomic weight of chlorine or bromine Restated, the polymer should not have a halogen content exceeding about 1 atom of chlorine or 3 atoms of bromine per double bond in the polymer.

This invention will be better understood by reference to the following examples.

*Example 1*

Two samples of an isobutylene-isoprene rubbery copolymer were prepared in a 13 wt. percent hexane solution. 1.55 wt. percent epoxyethane was incorporated into one solution and none in the other. Both solutions were treated with chlorine in identical manners. The chlorine content of the polymer was similar but the sample with the epoxyethane gave a neutral water wash, whereas the water wash of the control contained 91% of the theoretical acid. Thus a complete reduction in acid was obtained with no diminution of the chlorine content of the polymer.

In still another experiment, in which 1.55 wt. percent epoxyethane was present during chlorination, the water washing was omitted. The characteristics of the chlorinated polymer, after separation by steam slurrying, were similar in every respect to the polymers obtained in the two experiments mentioned above. This shows how the water washing can be eliminated through the improvement of this invention.

*Example 2*

A similar experiment as Example 1 was run except that epoxypropane was incorporated into the hexane solution. The polymer obtained is suitable for incorporation of stabilizers without any water washing step.

Example 3

Chlorinated butyl rubber samples were prepared containing epoxyethane and polyallylglycidyl ether in the prescribed quantities. These samples had not been water washed. They exhibited temperature stability after a 30 minute working on a 300° F. mill. The control, i.e., unwashed samples containing no epoxyethane exhibited marked degradation.

The advantages of this invention will be apparent to those skilled in the art. The requirements for separate neutralization and extensive water washing of the copolymer product is eliminated. A stable product of good color, thermal stability and low salt content is obtained.

It is to be understood that this invention is not limited to the specific examples which have been offered merely as illustrations and that modifications may be made without departing from the spirit of the invention.

What is claimed is:

1. In a process for preparing a halogenated butyl rubbery copolymer of isobutylene and a conjugated diolefin of 4 to 6 carbon atoms by halogenating the unhalogenated copolymer contained in solution in an inert hydrocarbon solvent with a halogenating agent at a temperature of about size 0 to 30° C. to a minimum halogen content of about 1 wt. percent the improvement which comprises carrying out the halogenation in the presence of a small amount of a lower epoxy alkane having from 2 to 5 carbon atoms, contacting the halogenated copolymer with an aqueous system of a stabilizer selected from the group consisting of calcium stearate and polyallylglycidyl ether and removing the water at a temperature of about 100° to 175° C., the stabilizer contacting step taking place after the halogenation step without any intervening treatment step.

2. The process of claim 1 in which the epoxy alkane is utilized in an amount of 0.7 to 5.0 wt. percent based on polymer.

3. The process of claim 1 in which the concentration of the polymer in the hydrocarbon solution is in the range of 5 to 25 wt. percent.

4. The process of claim 1 in which the epoxy alkane is epoxyethane.

References Cited in the file of this patent
UNITED STATES PATENTS

| | | |
|---|---|---|
| 2,327,517 | Frolich et al. | Aug. 24, 1943 |
| 2,595,619 | Voorthuis | May 6, 1952 |
| 2,804,448 | Hallenbeck | Aug. 27, 1957 |